US011399645B2

(12) United States Patent
Cook et al.

(10) Patent No.: US 11,399,645 B2
(45) Date of Patent: Aug. 2, 2022

(54) APPARATUS FOR UNIVERSAL STEMWARE STORAGE

(71) Applicant: BELLA TERRA INTERIOR SOLUTIONS, LLC, Garden City, GA (US)

(72) Inventors: William Donald Cook, Savannah, GA (US); Donald Greene Sanders, Savannah, GA (US)

(73) Assignee: BELLA TERRA INTERIOR SOLUTIONS, LLC, Garden City, GA (US)

(*) Notice: Subject to any disclaimer, the term of this patent is extended or adjusted under 35 U.S.C. 154(b) by 0 days.

(21) Appl. No.: 15/758,935

(22) PCT Filed: Sep. 12, 2016

(86) PCT No.: PCT/US2016/051332
§ 371 (c)(1),
(2) Date: Mar. 9, 2018

(87) PCT Pub. No.: WO2017/044955
PCT Pub. Date: Mar. 16, 2017

(65) Prior Publication Data
US 2018/0249852 A1    Sep. 6, 2018

Related U.S. Application Data

(63) Continuation of application No. 14/852,265, filed on Sep. 11, 2015, now Pat. No. 9,655,462.

(51) Int. Cl.
*A47G 23/02*    (2006.01)
*A47B 73/00*    (2006.01)

(52) U.S. Cl.
CPC ..... *A47G 23/0208* (2013.01); *A47G 23/0216* (2013.01); *A47B 73/00* (2013.01); *A47G 23/02* (2013.01)

(58) Field of Classification Search
CPC ............... A47G 23/02; A47G 23/0208; A47G 23/0216; A47G 23/0225; A47G 23/0233;
(Continued)

(56) References Cited

U.S. PATENT DOCUMENTS 117,765 A * 8/1871 Gibson ................. A47F 5/0037
211/77
294,309 A * 2/1884 Campbell ................. A45D 1/04
132/225

(Continued)

FOREIGN PATENT DOCUMENTS

FR        333643 A * 11/1903  ......... A47G 23/0208
WO    2008144858 A1  12/2008

OTHER PUBLICATIONS

European Patent Office, extended Search Report issued in application No. EP 16 84 5275, dated Aug. 8, 2019, 10 pgs.

*Primary Examiner* — Devin K Barnett
(74) *Attorney, Agent, or Firm* — Greenberg Traurig, LLP (57) ABSTRACT

An apparatus for securing one or more items of stemware includes a base plate, one or more posts, a retainer, and one or more feet. The feet and base plate cooperatively secure the base portion of the item of stemware, and the retainer includes arms defining a stem receiving space that secures the stem of the item of stemware. The feet are coupled to the arms. The arms are flexible so as to accommodate different sizes of stems and bases in stemware with a single rack.

9 Claims, 11 Drawing Sheets

(58) Field of Classification Search
CPC .. A47G 23/0241; A47G 23/025; A47G 23/03; A47G 23/0316; A47G 29/00; A47G 29/087; A47G 29/093; A47B 73/00; A47F 5/00; A47F 7/28
USPC ............ 211/71.01, 74–77, 85.29, 41.2–41.9; 206/560, 565, 217, 218; 248/310, 311.2, 248/311.3, 312, 312.1, 313, 316.7; D7/701, 707, 708

See application file for complete search history.

(56) References Cited

U.S. PATENT DOCUMENTS

| | | | | |
|---|---|---|---|---|
| 353,554 A * | 11/1886 | Godfrey | ................ | A47F 5/0037 211/77 |
| 593,312 A * | 11/1897 | Schandein | ............. | A47B 73/00 211/74 |
| 774,479 A * | 11/1904 | Lange | ................ | A47G 23/0208 206/426 |
| 817,148 A | 4/1906 | Allen | | |
| 995,982 A * | 6/1911 | Moore | ................... | F16B 2/246 248/410 |
| 1,017,102 A * | 2/1912 | Kaufman | ....................... | 248/313 |
| D53,853 S * | 9/1919 | Kimmel | ........................ | D6/574 |
| 1,435,839 A * | 11/1922 | Gold | ................ | A47G 23/0241 248/313 |
| 1,615,571 A * | 1/1927 | Franklin | .................. | A47K 1/09 248/108 |
| D72,705 S * | 5/1927 | Farber | .......................... | D7/706 |
| D72,708 S * | 5/1927 | Farber | .......................... | D7/705 |
| D72,709 S * | 5/1927 | Farber | .......................... | D7/702 |
| 1,627,652 A * | 5/1927 | Kornicker | ................ | A47F 7/00 248/158 |
| 1,805,366 A * | 5/1931 | Kaden | ..................... | A47K 1/09 211/65 |
| 1,888,141 A * | 11/1932 | Orth | ....................... | A47G 19/08 211/41.2 |
| 1,925,540 A * | 9/1933 | Neuschotz | ......... | A47G 23/0208 248/313 |
| 1,980,930 A * | 11/1934 | Arthur | ....................... | B01L 9/06 211/74 |
| 2,028,694 A * | 1/1936 | Spinks | ..................... | A47K 1/09 211/65 |
| 2,142,019 A * | 12/1938 | Warner | ................... | A47J 31/44 248/312 |
| 2,230,975 A * | 2/1941 | Gratz | ..................... | A47B 69/00 312/248 |
| 2,289,701 A * | 7/1942 | Engel | ..................... | B60N 3/103 248/311.2 |
| 2,319,249 A * | 5/1943 | Meyer | .................... | A47F 7/286 248/505 |
| 2,370,822 A * | 3/1945 | Taurman | ............ | A47G 23/0225 211/75 |
| 2,463,651 A * | 3/1949 | Stevens | ............. | A47G 23/0241 215/395 |
| 2,534,680 A * | 12/1950 | Poirier | ................. | A47G 23/025 211/76 |
| 2,603,357 A | 7/1952 | Zakos | | |
| 2,647,786 A * | 8/1953 | Locke | .................... | B65D 71/50 294/87.28 |
| 2,816,667 A * | 12/1957 | Tanay | .................... | A47J 47/16 211/76 |
| 2,956,686 A * | 10/1960 | Garey | ....................... | B01L 9/06 211/74 |
| 3,003,736 A * | 10/1961 | Hofgesang | ............ | A47G 29/08 248/229.26 |
| 3,214,031 A * | 10/1965 | McCauley | ........... | A47B 81/007 211/41.2 |
| D207,411 S * | 4/1967 | Diesinger | ..................... | D6/569 |
| 3,318,457 A * | 5/1967 | Krasnoff | ................ | A61M 5/1415 211/74 |
| 3,667,714 A * | 6/1972 | Ziaylek | ................ | A62C 13/78 248/284.1 |
| D259,452 S | 6/1981 | Hoffman | | |
| 4,334,623 A | 6/1982 | Geary | | |
| 4,350,253 A * | 9/1982 | Rusteberg | ................ | B01L 9/06 211/74 |
| D267,914 S | 2/1983 | Lin | | |
| 4,589,556 A * | 5/1986 | Peretz | ................... | A47L 15/505 211/41.2 |
| D292,161 S | 10/1987 | Spolter et al. | | |
| D301,670 S | 6/1989 | Kennedy | | |
| 4,860,895 A * | 8/1989 | Iaslovits | ............ | A47G 23/0208 206/426 |
| 4,947,991 A | 8/1990 | Snell | | |
| 5,116,003 A * | 5/1992 | Gerhardt | ................ | A47L 13/512 248/113 |
| 5,358,128 A * | 10/1994 | Belokin | ................ | A47B 73/008 211/75 |
| 5,396,993 A * | 3/1995 | Spitler | ..................... | A47J 47/16 211/41.2 |
| 5,655,673 A * | 8/1997 | Weterrings | ............. | A47B 81/00 211/74 |
| 5,715,953 A * | 2/1998 | Brown | ....................... | A47F 7/28 211/74 |
| 5,924,659 A * | 7/1999 | Babcock | ................... | B01L 9/50 248/106 |
| 6,126,256 A | 10/2000 | Doces, II | | |
| 6,279,760 B1 * | 8/2001 | Broeski | ................ | A47B 81/007 206/149 |
| 6,318,690 B1 * | 11/2001 | Chang | ...................... | A47K 1/08 248/312 |
| 6,386,379 B1 * | 5/2002 | Battaglia | ................ | A47B 96/06 211/106 |
| 6,394,285 B1 * | 5/2002 | Arthurs | ................ | A47L 15/505 211/41.9 |
| 6,808,149 B1 * | 10/2004 | Sendowski | ............... | A47K 5/13 211/75 |
| 7,017,759 B1 * | 3/2006 | Friend | .................... | A47B 73/00 211/75 |
| 7,028,962 B1 * | 4/2006 | Hostetler | ................ | B63B 17/00 211/75 |
| 7,083,070 B2 * | 8/2006 | McGuyer | ................ | A47G 23/08 211/77 |
| 7,131,545 B1 | 11/2006 | Grogan | | |
| 7,464,907 B1 * | 12/2008 | Lane | ........................ | A47K 1/09 211/75 |
| D600,925 S * | 9/2009 | Guffey | .......................... | D6/327 |
| D605,909 S * | 12/2009 | Wax | ............................ | D7/704 |
| D612,691 S * | 3/2010 | Barnes, Jr. | ..................... | D7/620 |
| 7,988,107 B2 * | 8/2011 | Miller | .................... | A47L 15/505 248/176.1 |
| 8,011,520 B2 * | 9/2011 | Spiers | ..................... | A47F 7/285 211/75 |
| D651,454 S * | 1/2012 | Chin | ........................... | D7/401.2 |
| 8,201,794 B1 * | 6/2012 | Pesola | ....................... | A45F 3/44 248/311.2 |
| 8,590,715 B2 * | 11/2013 | Gray | ..................... | A47G 23/0208 211/181.1 |
| 8,789,712 B2 * | 7/2014 | Johnson | ................ | A47F 5/0025 211/71.01 |
| 8,887,930 B1 * | 11/2014 | Krull | ....................... | A47J 47/00 211/77 |
| 9,016,651 B2 * | 4/2015 | Webb | .................... | A47G 23/0225 248/146 |
| 9,220,337 B1 * | 12/2015 | Wenzel | .................... | A47B 13/021 |
| 9,526,378 B2 * | 12/2016 | Heron | ..................... | A47J 47/16 |
| 9,549,627 B1 * | 1/2017 | Grady | ................ | A47G 23/0208 |
| 9,655,462 B2 * | 5/2017 | Cook | ................ | A47G 23/0216 |
| 9,756,985 B2 * | 9/2017 | Knight, Sr. | ............. | A47J 47/16 |
| D809,871 S * | 2/2018 | Wobschall | ......... | A47G 23/0225 D7/620 |
| 2001/0025824 A1 * | 10/2001 | Olivero | ................ | A47B 73/00 211/74 |
| 2002/0070324 A1 * | 6/2002 | Huang | ................ | A47G 23/0225 248/311.2 |
| 2002/0170868 A1 * | 11/2002 | Morgan | ................ | A47G 19/30 211/77 |

(56) References Cited

U.S. PATENT DOCUMENTS

| | | | |
|---|---|---|---|
| 2003/0080077 A1* | 5/2003 | Ruiz | A47G 23/0208 211/85.29 |
| 2004/0135049 A1* | 7/2004 | Kent-Fawkes | B65D 23/106 248/311.2 |
| 2005/0082456 A1* | 4/2005 | Petri | B65G 17/323 248/312 |
| 2005/0236345 A1* | 10/2005 | Herbst | A47L 15/503 211/41.9 |
| 2005/0263464 A1 | 12/2005 | Nunn | |
| 2005/0269471 A1* | 12/2005 | Wagner | B60N 3/102 248/311.2 |
| 2005/0274639 A1* | 12/2005 | Meissen | B65D 11/1866 206/427 |
| 2006/0113263 A1* | 6/2006 | Kratochvil | A47G 23/0208 211/85.29 |
| 2006/0138064 A1* | 6/2006 | Crudgington, Jr. | A47L 15/505 211/41.9 |
| 2006/0169656 A1* | 8/2006 | Belden | A47G 23/0208 211/84 |
| 2006/0261020 A1* | 11/2006 | Braen | A47F 7/0064 211/85.29 |
| 2007/0062939 A1* | 3/2007 | Davis | A47G 19/065 220/23.2 |
| 2008/0173600 A1* | 7/2008 | Mungal | A47G 23/02 211/71.01 |
| 2008/0191112 A1* | 8/2008 | Parker | A47G 23/0208 248/312 |
| 2009/0230065 A1* | 9/2009 | Wax | A47G 23/0208 211/60.1 |
| 2009/0255888 A1* | 10/2009 | Melvin | A47L 15/505 211/85.29 |
| 2010/0012807 A1* | 1/2010 | Perman | A45F 5/02 248/312 |
| 2010/0176139 A1 | 7/2010 | Nargi | |
| 2011/0253650 A1* | 10/2011 | Renz | A47L 15/503 211/41.9 |
| 2012/0031861 A1* | 2/2012 | Haltmayer | A47L 15/503 211/41.9 |
| 2012/0112019 A1* | 5/2012 | Webb | A47G 23/02 248/121 |
| 2012/0286120 A1* | 11/2012 | Ziaylek | F17C 13/084 248/312 |
| 2013/0062494 A1 | 3/2013 | Cecil | |
| 2013/0240468 A1* | 9/2013 | Mikhailov | B01L 9/06 211/71.01 |
| 2014/0021149 A1* | 1/2014 | Eng | A47L 15/505 211/41.8 |
| 2014/0131530 A1* | 5/2014 | Webb | A47G 23/02 248/125.1 |
| 2014/0209769 A1 | 7/2014 | DeWald | |
| 2014/0339116 A1* | 11/2014 | Chiorazzi | A47G 23/0625 206/426 |
| 2014/0360955 A1* | 12/2014 | Presenty | A47B 96/1466 211/75 |
| 2015/0014492 A1* | 1/2015 | Sharpe | A61J 1/16 248/121 |
| 2015/0296978 A1* | 10/2015 | Cross | A47B 73/00 211/74 |
| 2016/0037997 A1* | 2/2016 | Mesa | A47L 15/503 134/166 R |
| 2016/0135634 A1* | 5/2016 | Krull | A47J 47/16 29/428 |
| 2016/0157606 A1* | 6/2016 | Kaelin | B08B 9/42 211/74 |
| 2017/0135553 A1* | 5/2017 | Mesa | A47L 15/50 |
| 2017/0258294 A1* | 9/2017 | Mesa | A47L 15/503 |
| 2018/0035865 A1* | 2/2018 | Citak | A47L 15/505 |
| 2018/0363839 A1* | 12/2018 | Breit | A47G 23/0225 |

* cited by examiner

APPARATUS FOR UNIVERSAL STEMWARE STORAGE

FIELD OF THE DISCLOSURE

This disclosure is generally directed to apparatus for securing stemware, including, for instance, in the transit (e.g., aviation, maritime, and train) and shipping fields, and more particularly to apparatus for universal stemware storage.

BACKGROUND OF RELATED ART

In passenger transit vehicles, such as airplanes, ships, trains, and automobiles, food service items are often provided for passengers and crew, including serving dishes, flatware, and stemware, for example. In most instances, these service items must be secured within the vessel when not in use for the safety of crew and passengers and to prevent breakage of the service items, yet must be accessible to crew members and passengers for use during transit. Accordingly, well-designed storage solutions for each type of service item are desired.

Stemware, in particular, presents a unique storage challenge in passenger transit. Items of stemware are generally not amenable to stacking or nested storage, like most flatware and serving dishes. Furthermore, a single item of stemware generally has numerous components, including a base, a stem, and a bowl, that all may be fragile. Still further, numerous types of stemware may all be stored together (e.g., red wine glasses, white wine glasses, champagne flutes), each having its own base, stem, and/or bowl dimensions.

Accordingly, the inventors of this disclosure have recognized the need for various apparatus to accommodate the shape and size variations between different types of stemware.

DETAILED DESCRIPTION

The following description of example methods and apparatus is not intended to limit the scope of the description to the precise form or forms detailed herein. Instead the following description is intended to be illustrative so that others may follow its teachings. It should be noted that, throughout the drawings, many elements that are present in numerous drawings are not labeled with the reference numerals of this disclosure in all figures in which those elements appear. This is for clarity of illustration only.

The present disclosure is generally directed toward apparatus for securing and storing stemware. In general, these apparatus may find use in passenger transit vehicles, such as airplanes, ships, trains, automobiles, and the like. Additionally, the apparatus of the present disclosure may find use in commercial shipping (e.g., securing stemware within a box or crate for shipping from a manufacturer or retailer to a customer, for example). However, it will be appreciated by one of the ordinary skill in the art that the disclosed stemware rack may be used in a wide variety of applications, including and in addition to those explicitly mentioned herein. The apparatus of the present disclosure may improve upon known designs by more robustly and securely accommodating a variety of sizes and shapes of stemware, among other things.

An example of an apparatus 10 for securing an item of stemware is illustrated in FIGS. 1-9. Each apparatus of this disclosure for securing one or more items of stemware may be referred to as a "rack"—that is, FIGS. 1-9 illustrate an example of a stemware rack 10.

Figure 1:
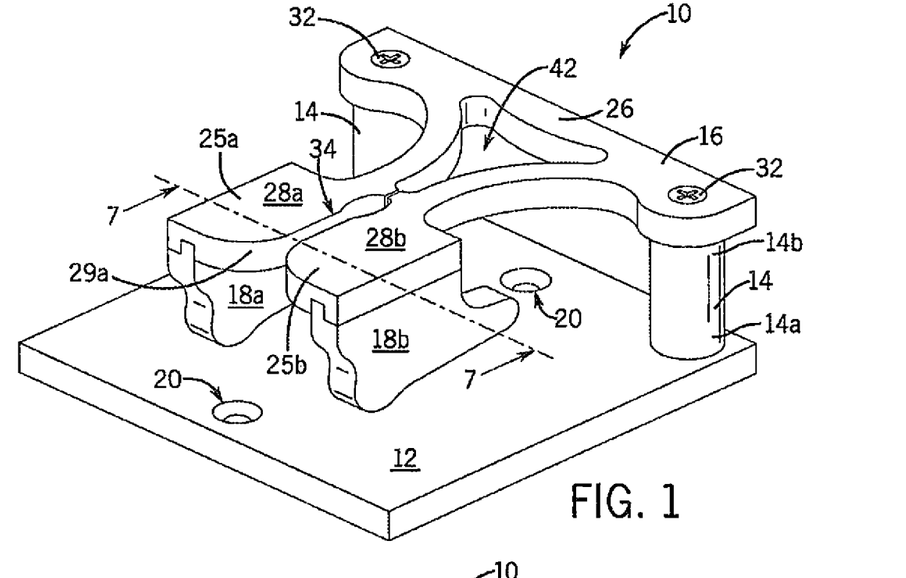
FIG. 1 is an isometric view of an example apparatus for securing an item of stemware (referred to herein as a "stemware rack").
Figure 2:
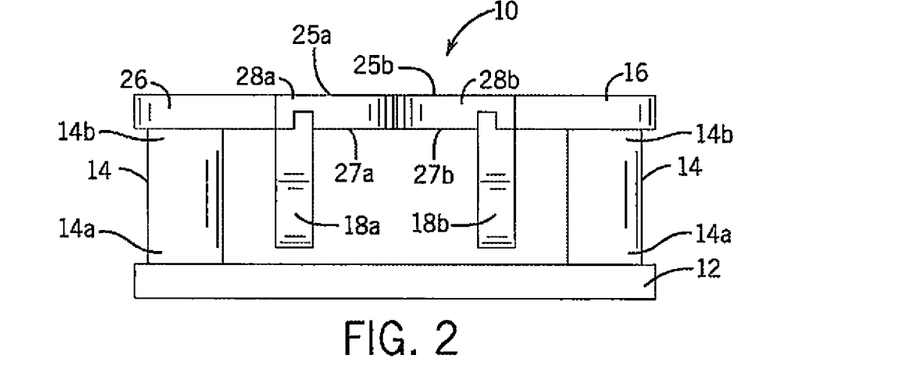
FIG. 2 is a "front" plan view of the stemware rack of FIG. 1.
Figure 3:
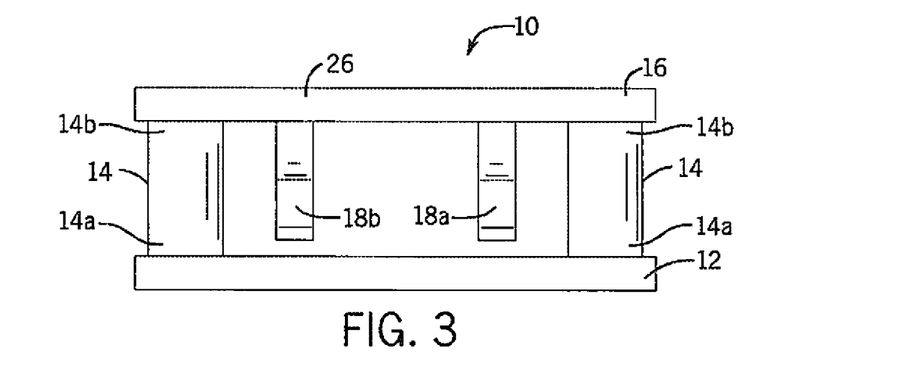
FIG. 3 is a "rear" plan view of the stemware rack of FIG. 1.

Referring to FIGS. 1-9, the example stemware rack 10 includes a base plate 12, two posts 14, a retainer 16, and two feet 18a, 18b, with the components arranged so that the rack 10 is configured to secure a single item of stemware. In this example, each post 14 has a first end 14a and a second end 14b, with the first end 14a coupled to the base plate 12 and the second end 14b coupled to the retainer 16. The direction from which an item of stemware is intended to be inserted into the rack 10 to secure the item of stemware with the rack, which is the perspective of FIG. 2, is referred to herein as the "front" of the rack 10. This is for ease of description only. The rack 10 is not limited in use to any particular orientation. The feet 18 are coupled to front of the retainer 16.

The base plate 12 of the example rack 10 is a monolithic piece of material having a generally planar surface facing the feet and retainer. Of course, the base plate 12 may alternatively be formed from multiple pieces of material and/or may be contoured, in other examples, as desired. The example base plate 12 defines two apertures 20 through which respective mechanical fasteners may be inserted to couple the base plate 12 to a support surface (e.g., a surface of an airplane, ship, train, or other vehicle, or any other suitable support surface, including but not limited to shelving, counters, etc.) so as to fasten the rack 10 to the support surface, and two additional apertures 22 through which fasteners 24 may be inserted to couple the base plate 12 with the posts 14 (see FIG. 9). In other examples, the base plate 12 may be coupled to a support surface or to one or more posts (e.g., posts 14) with adhesive, friction fit, or other coupling means, and therefore the base plate 12 may lack apertures 20 for fasteners for such purposes or may include apertures in a configuration different than that illustrated in the figures.

The posts 14 of the example rack 10 are coupled to the base plate 12 with mechanical fasteners 24, such as screws, and extend generally perpendicular to the planar surface of the base plate. The example posts 14 are substantially identical cylindrical rigid members made of or comprising metal, such as aluminum. In other examples, the posts 14 may differ from each other and may differ from the exact details of this example. For example, a post 14 may have a shape other than a cylinder. In another example, another metal may be used, or a non-metallic material may be used. For example, a polymer, wood, composite, and/or another suitable material may be used. Still further, in another example, a post 14 may be integrally formed with the base plate 12 and/or the retainer 16.

In another example, the base plate 12 may be omitted, and a support surface may functionally serve as the "base plate." In such an example, the posts 14 may be coupled directly to the support surface with mechanical fasteners, such as screws, with adhesive, and/or with other suitable coupling means.

With continued reference to FIGS. 1-9, in this example, the retainer 16 includes a back support 26 and two front arms 28a, 28b made from a monolithic piece of material. As assembled, the retainer 16 is supported so as to be generally parallel with the base plate 12 and generally perpendicular to the posts 14. The back support 26 is coupled to the posts 14 with mechanical fasteners 32, such as screws. The retainer 16 defines a plurality of spaces and apertures. Two such apertures 30 are provided for fasteners 32 that couple the back support 26 to the posts 14. A space 34 is provided for receiving the stem of an item of stemware and may be referred to in this disclosure as a "stem receiving space" 34.

The two arms 28a, 28b of the retainer 16 collectively define the stem receiving space 34. Each arm 28a, 28b includes a respective "top" horizontal surface 25a, 25b, a respective "bottom" horizontal surface 27a, 27b, and one or more respective vertical surfaces 29a, 29b perpendicular to the top and bottom surfaces 25a, 25b, 27a, 27b. The two arms 28a, 28b include substantially mirrored vertical surfaces 29a, 29b that collectively define the stem receiving space 34.

Figure 4:
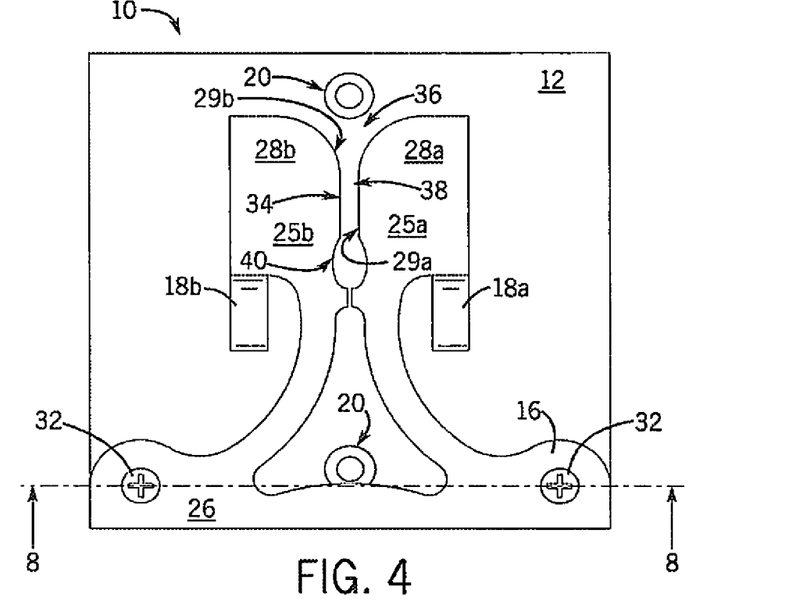
FIG. 4 is a "top" plan view of the stemware rack of FIG. 1.

In this example, the stem receiving space 34 comprises a tapered opening 36, a linear portion 38, and an annular portion 40 (see FIG. 4). In this example configuration, the linear portion 38 is closer to the front of the rack 10 than is the annular portion 40. Accordingly, the stem of an item of stemware may be inserted through the tapered opening 36 and the linear portion 38 to reach the annular portion 40. The diameter of the annular portion 40 is larger than the width of at least a part of the linear portion 38. Accordingly, once the stem of the item of stemware is secured within the annular portion 40, it may be unable to easily fall out of the rack through the linear portion 38.

The arms 28a, 28b of the example retainer 16 extend forward and towards each other from respective lateral portions of the back support 26. Accordingly, the arms 28a, 28b are separated by a generally triangular opening 42 (see FIG. 1) that narrows from back to front. IN this example, other than sharing the common back support 26 of the retainer 16, the arms 28a, 28b are not coupled to each other. In other examples, the arms 28a, 28b may be coupled to each other at one or more locations.

The arms 28a, 28b of the example retainer 16 are elastic and flexible so as to allow the arms 28a, 28b to separate from each other as the stem of an item of stemware is inserted through the linear portion 38 of the stem receiving space 34 and to then elastically return to secure the stem within the annular portion 40 of the stem receiving space 34. As noted above, in the example rack 10, the annular portion 40 of the stem receiving space 34 has a diameter that is larger than the width of at least a part of the linear portion 38. As a result, once the stem of an item of stemware is inserted through the linear portion 38 and reaches the annular portion 40, the arms 28 can elastically flex towards each other so that the annular portion 40 surrounds the stem and the stem cannot inadvertently slide back out through the linear portion 38 of the stem receiving space 34.

The feet 18a, 18b of the example stemware rack 10 are each formed from a monolithic piece of material and are substantially identical to each other in size and shape. Therefore, when an item of stemware is inserted into the rack 10, each foot 18 applies force to the base of the item of stemware towards the base plate 12 of the rack 10 and, once the item of stemware has been fully inserted into the rack 10, to secure the base of the item of stemware between the feet 18a, 18b and the base plate 12. The feet 18a, 18b apply such force independent of each other by virtue of their coupling with different arms 28a, 28b of the rack 10.

Figure 5:
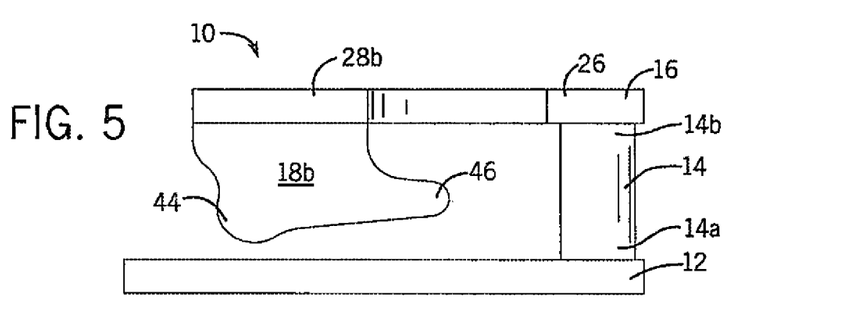
FIG. 5 is a "right" plan view of the stemware rack of FIG. 1.
Figure 6:
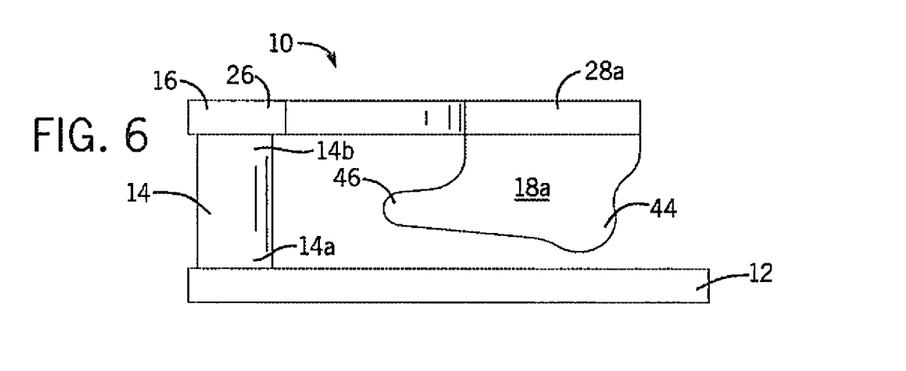
FIG. 6 is a "left" plan view of the stemware rack of FIG. 1.

Each foot 18a, 18b includes a first, "front" rounded protrusion 44 and a second, "rear" rounded protrusion 46, in the example rack 10 (see FIGS. 5 and 6). Both rounded protrusions 44, 46 help secure the base of the item of stemware once the item of stemware is placed in the rack 10. As a result of the front protrusion 44, a separation between the foot 18 and the base plate 12 is smaller at the front of the foot 18 than farther back on the foot 18 so as to prevent the base of an item of stemware from slipping out of the rack 10 once the item of stemware is secured within the rack 10.

Figure 7:
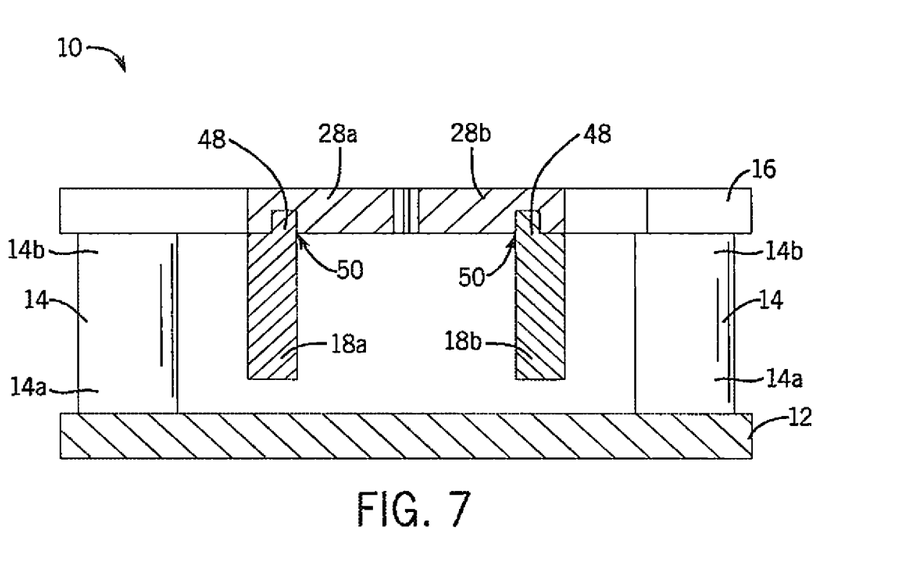
FIG. 7 is a cross-sectional view of the stemware rack of FIG. 1, taken along line 7-7 in FIG. 1.
Figure 8:
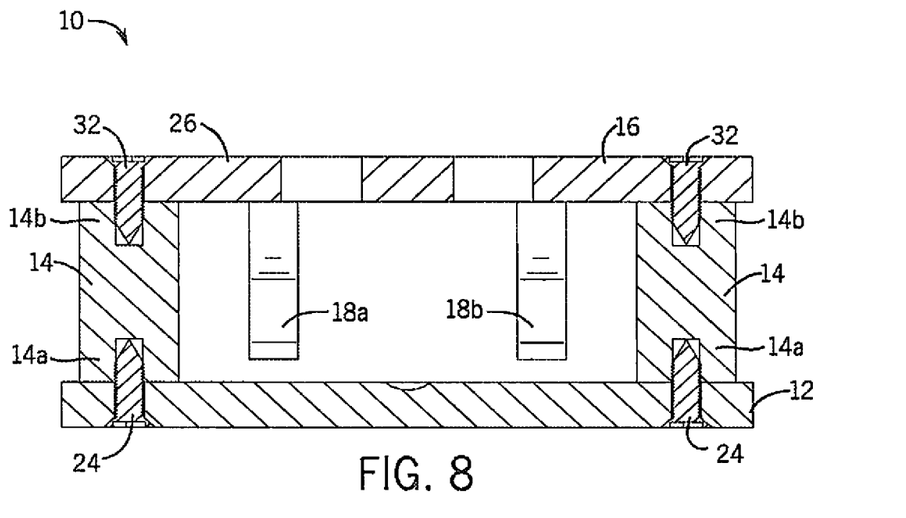
FIG. 8 is a cross-sectional view of the example stemware rack, taken along line 8-8 in FIG. 4.
Figure 9:
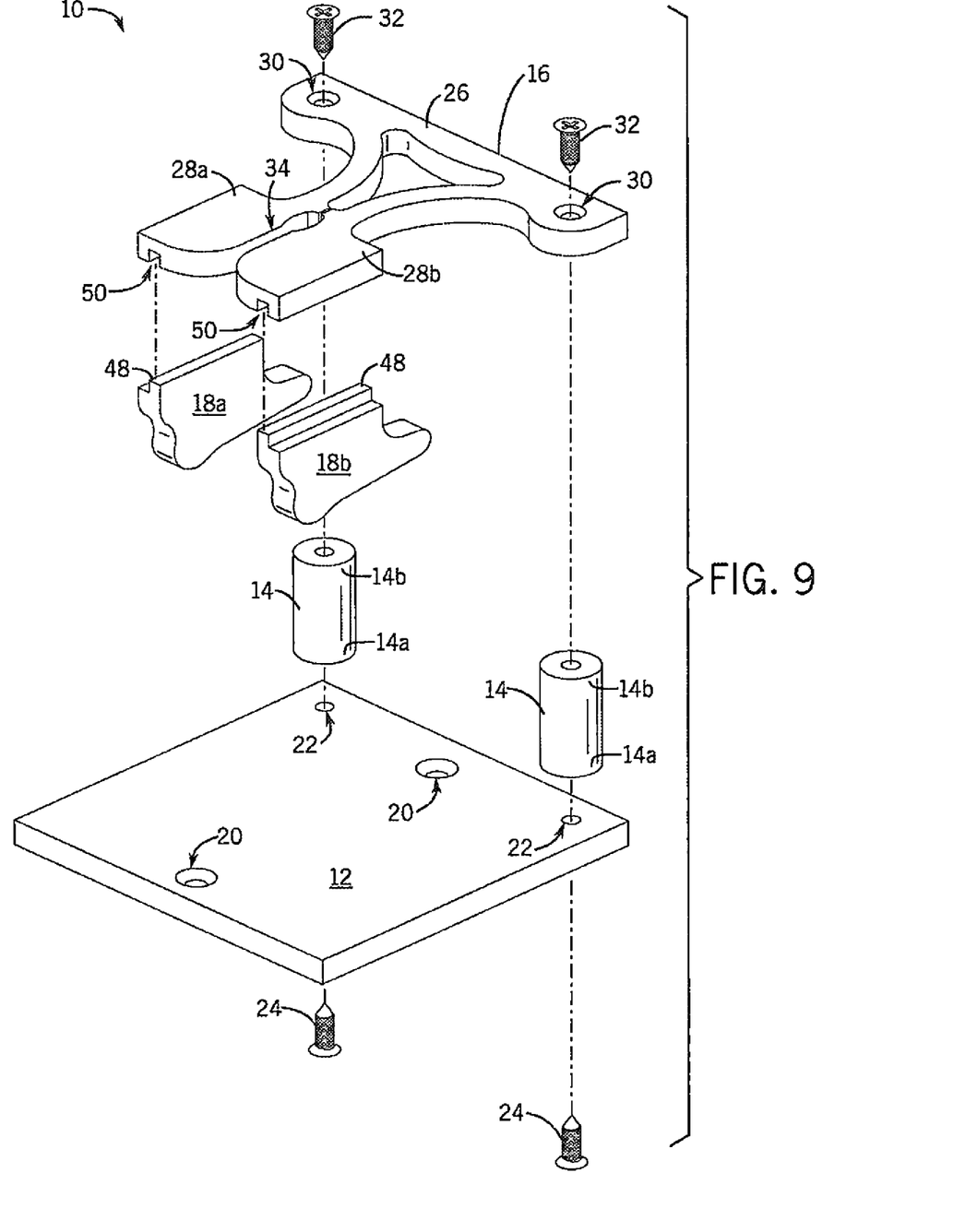
FIG. 9 is an exploded view of the stemware rack of FIG. 1.
Figure 10:
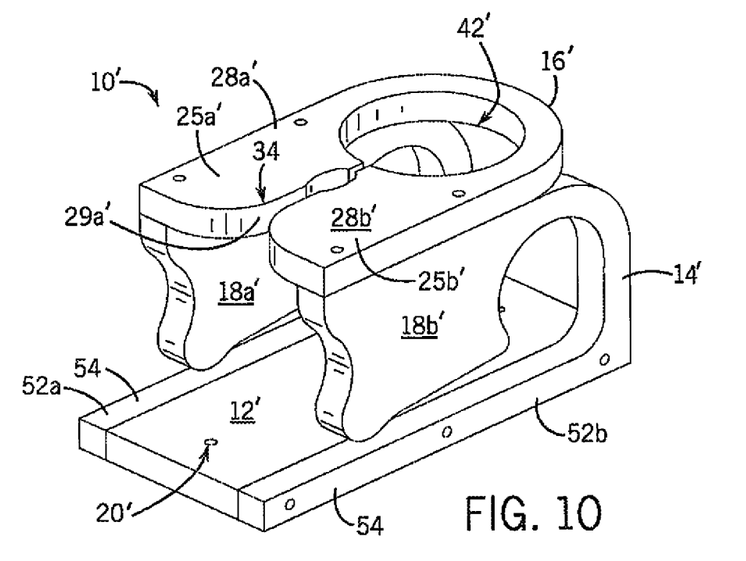
FIG. 10 is an isometric view of an example of a stemware rack.
Figure 11:
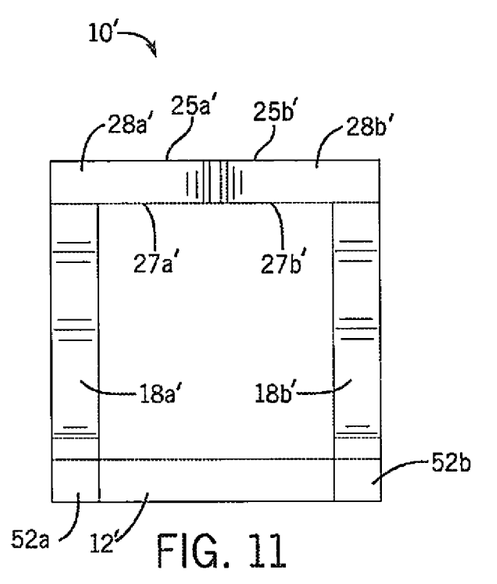
FIG. 11 is a "front" plan view of the stemware rack of FIG. 10.
Figure 12:
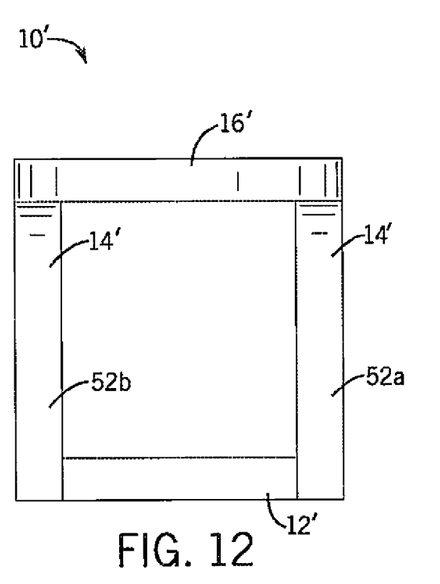
FIG. 12 is a "rear" plan view of the stemware rack of FIG. 10.
Figure 13:
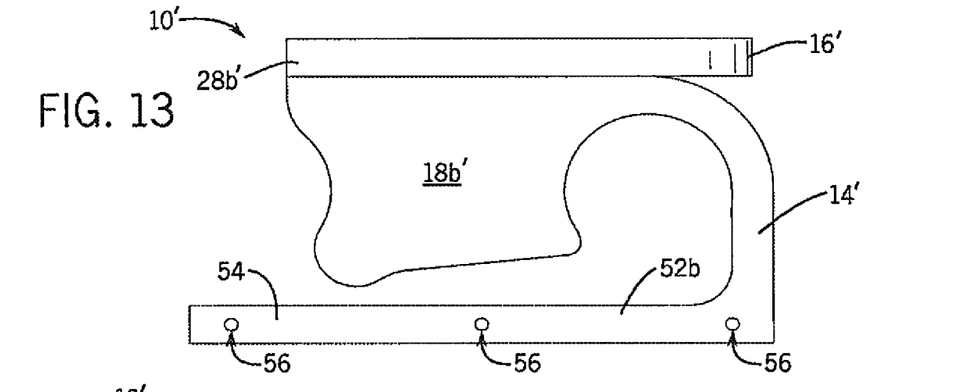
FIG. 13 is a "right" plan view of the stemware rack of FIG. 10.
Figure 14:
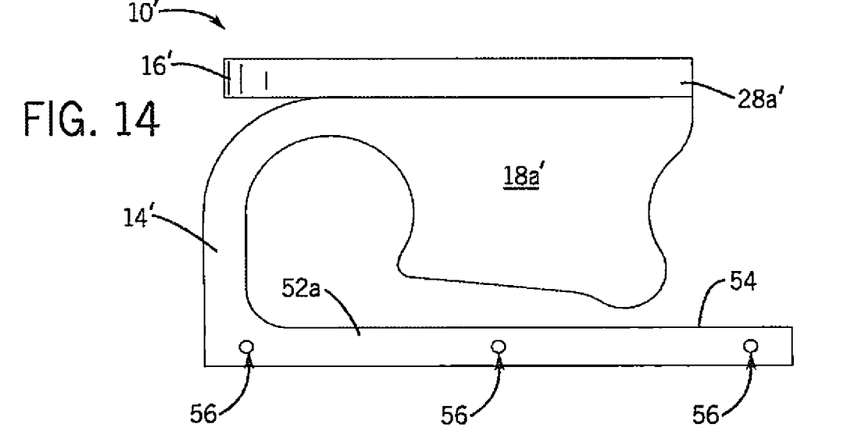
FIG. 14 is a "left" plan view of the stemware rack of FIG. 10.

Referring to FIGS. 7 and 9, each foot 18a, 18b is interference-fit with a respective arm 28a, 28b. In particular, each foot 18a, 18b includes a coupling protrusion 48, and each arm 28a, 28b includes a coupling recess 50, and the coupling protrusion 48 is inserted into the coupling recess 50. Of course, in other examples, the foot 18a, 18b may be coupled with the arm 28a, 28b or otherwise with the retainer 16 through any other suitable means, such as with an adhesive, with a different interference-fit configuration, and/or with a mechanical fastener.

The design and configuration of the feet 18a, 18b disclosed herein are exemplary only. In other examples, other features and arrangements of the feet 18a, 18b may be desired. For example, the feet 18a, 18b may be substantially different from each other, may have more or fewer than two protrusions, or may have a generally different shape, size, or design to achieve substantially the same function. Furthermore, more or fewer than two feet 18a, 18b may be used to secure a single item of stemware, in other examples.

Other than the posts 14 and the fasteners 24, 32, the example rack 10 is made from polymer. More specifically, the base plate 12, the retainer 16, and the feet 18a, 18b are made from polymer, such as a polycarbonate resin, such as one available under the trade name LEXAN from Sabic Global Technologies B.V. Particular formulations of LEXAN advantageously have high temperature tolerances, enabling the example rack 10 to pass FAA-required burn tests such that the example rack 10 can be used in aviation applications, but are soft enough not to scratch stemware and are flexible and elastic enough for the operation of the example rack 10 as disclosed herein. In other examples, other appropriate polymers or other materials may be used. In particular, for non-aviation embodiments, a material may be used with a lower temperature tolerance instead of LEXAN.

In the example rack 10, without an item of stemware inserted, the retainer 16 is disposed about 1.0 inches from the base plate 12, and the bottom of the feet 18a, 18b are disposed about 0.125 inches from the base plate 12. In other examples, these distances may be between about 0.5 to 12.0 inches, inclusive, and about 0.125 to 1.0 inches, inclusive, respectively.

FIGS. 10-16 illustrate a similar example of a stemware rack 10'. As with the rack 10, the rack 10' is configured to receive a single item of stemware. The example rack 10' includes a base plate 12', a retainer 16', and two lateral supports 52a, 52b, each lateral support 52a, 52b including a lateral base portion 54, a post 14', and a respective foot 18a', 18b'. Except as disclosed differently below, the characteristics of similar components of the rack 10 given above and labeled with prime notation are also found in the rack 10'.

The base plate 12' of the example rack 10' is a monolithic piece of material having a generally planar surface facing towards the feet 18a', 18b'. Of course, the base plate 12' may alternatively be formed from multiple pieces of material and may be contoured, in other examples. The base plate 12' defines two apertures 20' through which respective mechanical fasteners (these and other mechanical fasteners are not illustrated with respect to the rack 10') may be inserted to couple the base plate 12' to a support surface (e.g., a surface of an airplane, ship, train, or other vehicle, or any other suitable support surface, including, but not limited to, shelving, counters, etc.) so as to fasten the rack 10' to the support surface. In other examples, the base plate 12' may be coupled to a support surface with adhesive, friction fit, or other coupling means, and therefore the base plate 12' may lack apertures for fasteners for such purposes or may include spaces in a configuration different than that illustrated in the figures.

The retainer 16' of the example rack 10' is a monolithic piece of material that is generally parallel with the base plate 12' when the rack 10' is assembled. The retainer 16' defines a plurality of apertures and spaces. Four such apertures 30' (see FIG. 16) are provided for fasteners that couple the retainer 16' to the lateral supports 52a, 52b. A space 34' is provided for receiving the stem of an item of stemware and may be referred to in this disclosure as a "stem receiving space" 34'. The retainer 16' is coupled to the lateral supports 52a, 52b with mechanical fasteners, such as screws.

The two arms 28a', 28b' of the retainer 16' collectively define the stem receiving space 34'. Each arm 28a', 28b' includes a respective "top" horizontal surface 25a', 25b' (facing out of the page in the perspective of FIG. 15), a respective "bottom" horizontal surface 27a', 27b', and one or more respective vertical surfaces 29a', 29b' perpendicular to the top and bottom surfaces 25a', 25b', 27a', 27b'. The two arms 28a', 28b' include substantially mirrored vertical surfaces 29a', 29b' that collectively define the stem receiving space 34'.

Figure 15:
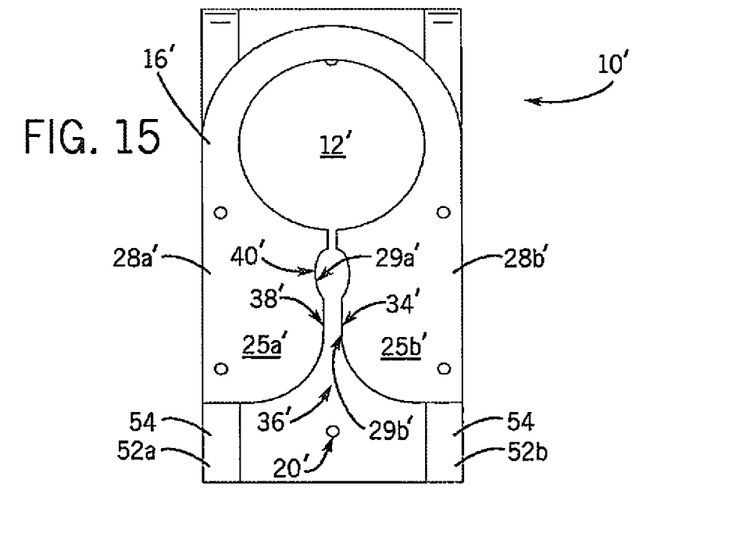
FIG. 15 is a "top" plan view of the stemware rack of FIG. 10.
Figure 16:
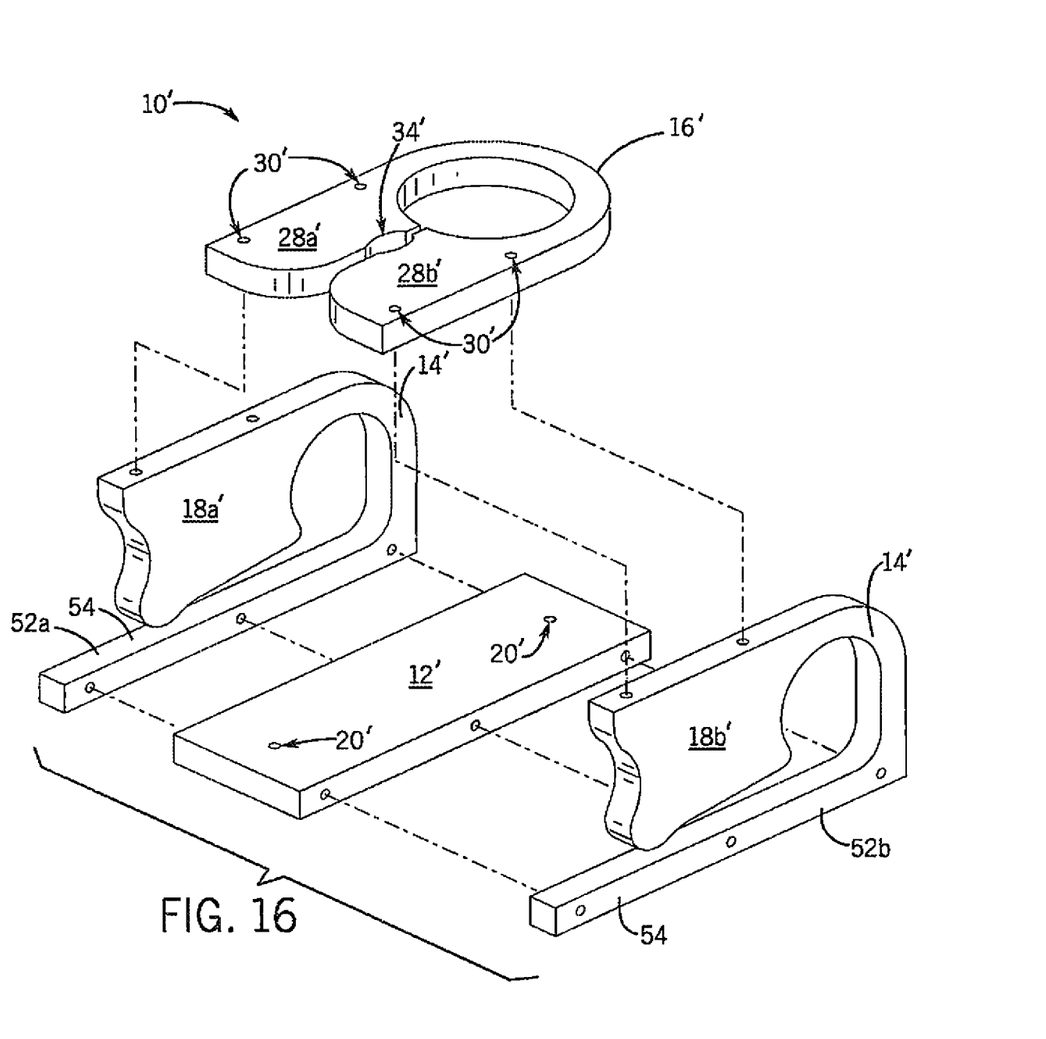
FIG. 16 is an exploded view of the stemware rack of FIG. 10.

The stem receiving space 34' comprises a tapered opening 36', a linear portion 38', and an annular portion 40' (see FIG. 15). The linear portion 38' is closer to the front of the rack 10' than is the annular portion 40'. Accordingly, the stem of an item of stemware may be inserted through the tapered opening 36' and the linear portion 38' to reach the annular portion 40'. The diameter of the annular portion 40' is larger than the width of at least a part of the linear portion 38'. Accordingly, once the stem of the item of stemware is secured within the annular portion 40', it may be unable to easily fall out of the rack 10' through the linear portion 38'. In the example, the arms 28a', 28b' are coupled to each other at a rear attachment point, and extend forward from the attachment point in a curvilinear fashion so as to define a generally circular opening 42' behind the stem receiving space 34'.

Each lateral support 52a, 52b includes a lateral base portion 54, a post 14', and a foot 18', all made from a single monolithic body of material, in the example rack 10'. When assembled, each lateral base portion 54 is arranged generally parallel with the base plate 12' and includes apertures 56 (see FIGS. 13 and 14) through which mechanical fasteners may be inserted to couple the lateral base portion 54 with the base plate 12'. The post 14' of each lateral support 52a, 52b extends generally perpendicularly from the lateral base portion 54 and curves forward into a foot 18'.

In another example, the base plate 12' may be omitted, and a support surface may functionally serve as the "base plate." In such an example, the lateral supports 52a, 52b may be coupled directly to the support surface with mechanical fasteners, such as screws, with adhesive, and/or with other suitable coupling means.

When an item of stemware is inserted into the rack 10', each foot 18a', 18b' applies force to the base of the item of stemware towards the base plate 12' and the lateral base portion 54 of the rack 10'. The feet 18a', 18b' apply such pressure independent of each other by virtue of their inclusion on separate lateral supports 52a, 52b of the rack.

The example rack 10' is made from polymer. More specifically, the base plate 12', the retainer 16', and the lateral supports 52 are made from polymer, such as a polycarbonate resin, such as one available under the trade name LEXAN from Sabic Global Technologies B.V. In other examples, other appropriate polymers or other appropriate materials, such as wood or composite, may be used. In particular, for non-aviation embodiments, a material may be used with a lower temperature tolerance than LEXAN.

The operation of the rack 10' will now be described with respect to FIGS. 17-19. The rack 10 illustrated in FIGS. 1-10 functions similarly.

Figure 17:
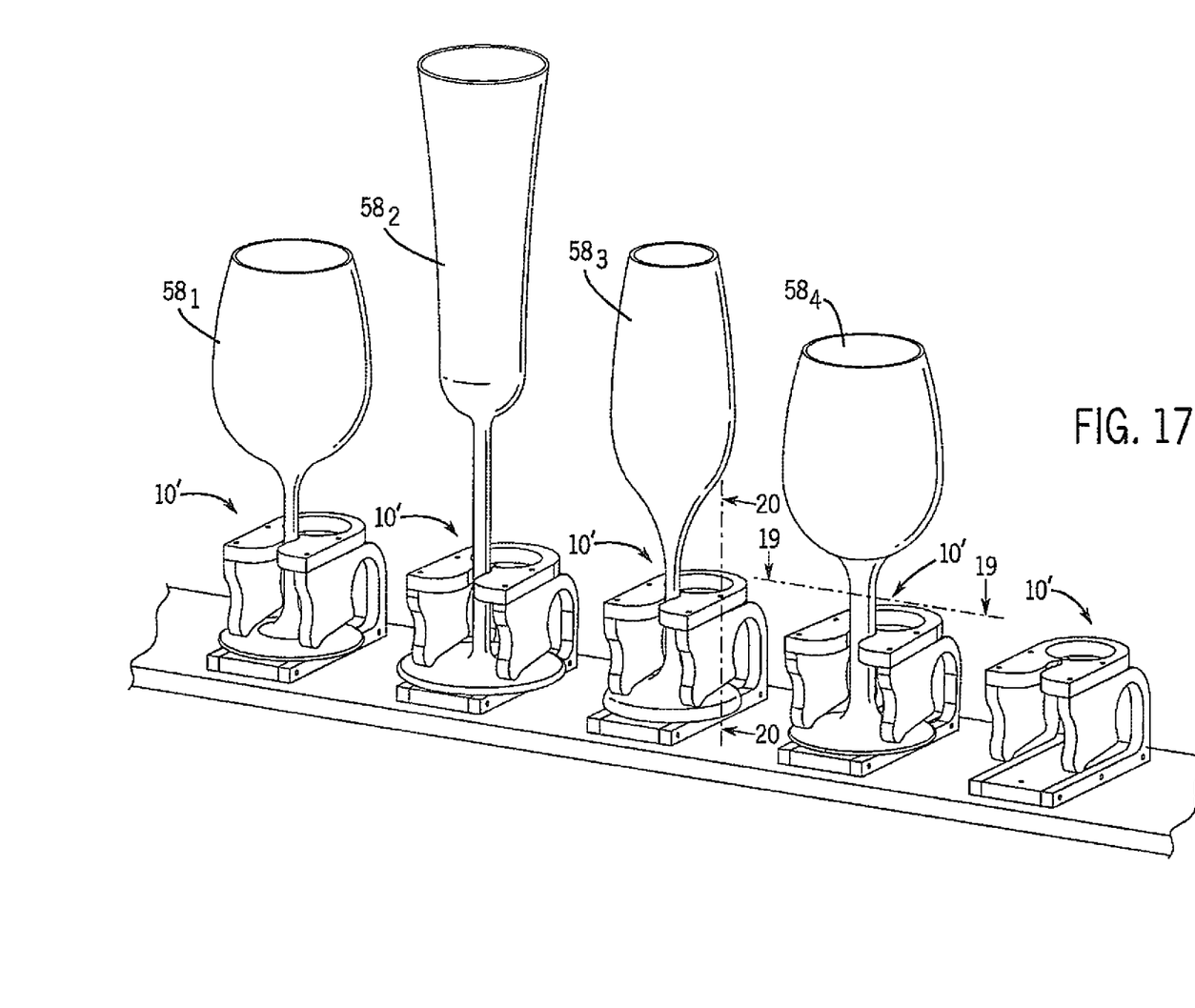
FIG. 17 is an isometric view of a plurality of copies of the stemware rack of FIG. 10, each shown in operation securing a respective item of stemware.

FIG. 17 is an isometric view of five copies of the rack 10', four of which are securing four respective separate items of stemware $58_1$, $58_2$, $58_3$, $58_4$. As shown in FIG. 17, the rack 10' is capable of securing items of stemware of different stem thicknesses (for example, compare the thickness of the stem of the first item of stemware $58_1$ with the thickness of the stem of the fourth item of stemware $58_4$) by virtue of the above-described configuration of the arms 28a', 28b' and the stem receiving space 34'. The rack 10' is further able to secure items of stemware of different base thicknesses and widths by virtue of the above-described configuration of the feet 18a', 18b'.

Figure 18:
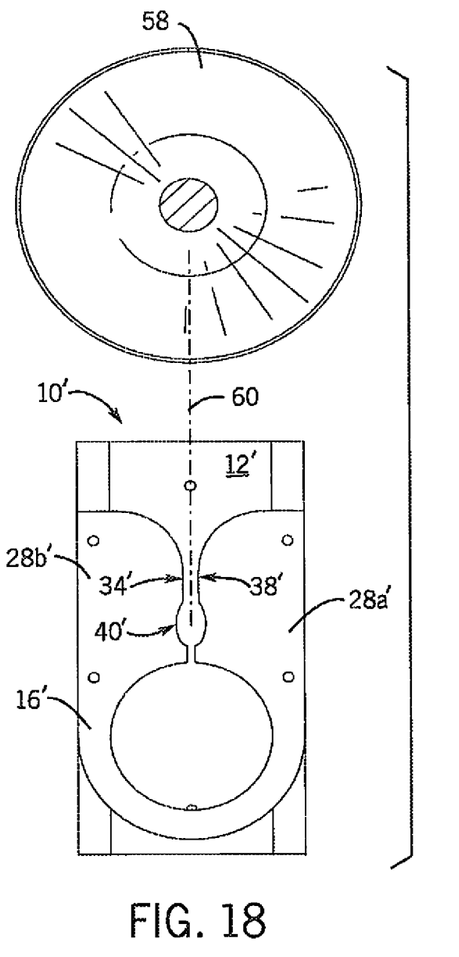
FIG. 18 is a plan view of the stemware rack of FIG. 10, illustrating a method by which the item of stemware may be secured with the apparatus.
Figure 19:
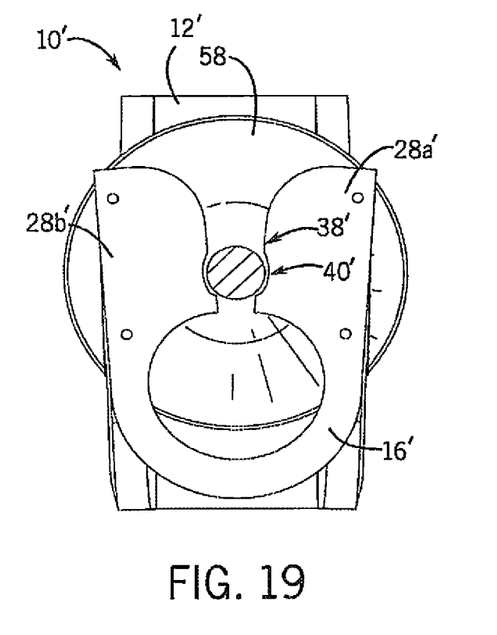
FIG. 19 is a cross-sectional view of the stemware rack of FIG. 10, illustrated in operation with an item of stemware, taken along line 19-19 in FIG. 17.

FIGS. 18 and 19 illustrate a method by which an item of stemware 58 may be inserted into the example rack 10' so as to be secured by the example rack 10'. Referring to FIG. 18, the item of stemware 58 may be inserted from the front of the rack 10' along the dash-dot line 60 shown in the figure, with the base of the item of stemware on the base plate 12'. As the stem of the item of stemware 58 is inserted through the linear portion 38' of the stem receiving space 34', the arms 28a', 28b' flex away from each other. When the stem reaches the annular portion 40' of the stem receiving space 34', the arms 28a', 28b' elastically return towards each other so as to clasp the stem in the annular portion 40' of the stem receiving space 34', as illustrated in FIG. 19. If the stem is larger than the annular portion 40' of the stem receiving space 34', the arms 28a', 28b' may not return to the same position as before the item of stemware 58 was inserted.

Figure 20:
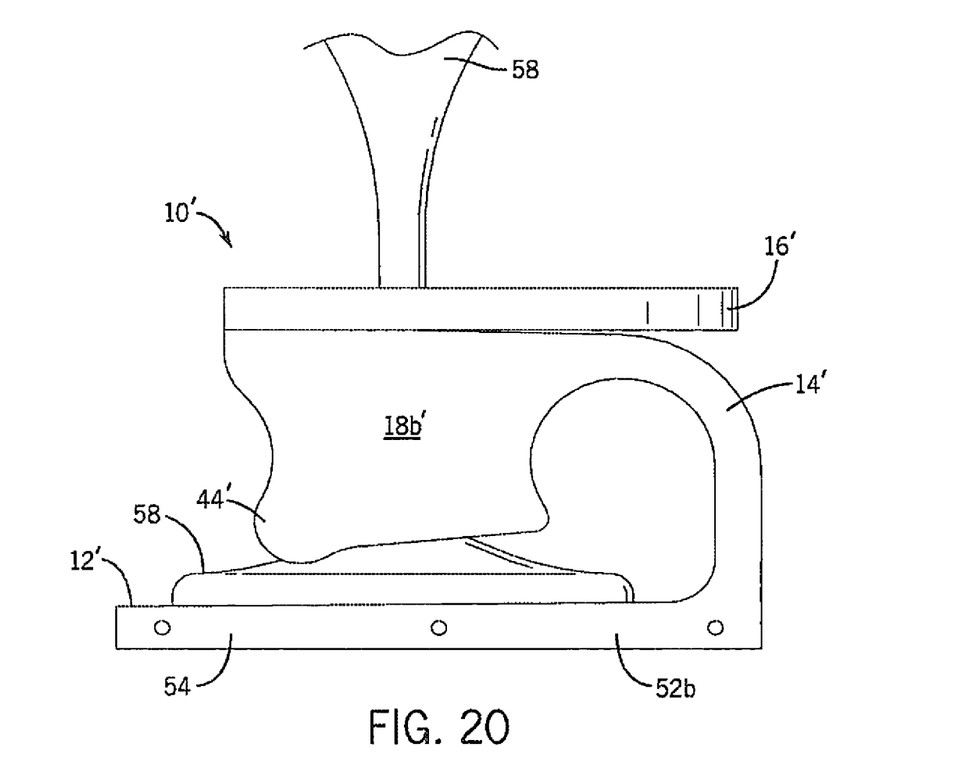
FIG. 20 is a "right" plan view of the stemware rack of FIG. 10, illustrated in conjunction with a portion of an item of stemware.

Referring to FIG. 20 to further disclose the operative function of the example rack 10', as the item of stemware 58 is inserted, each foot 18a', 18b' will flex upwards to accommodate the base of the item of stemware 58 until the base of the item of stemware 58 clears the front protrusion 44' of the foot 18a', 18b', at which point the foot 18a', 18b' will elastically return to apply pressure to the base of the item of stemware 58 towards the base plate 12'. Once the base of the item of stemware 58 is secured between the feet 18a', 18b' and the base plate 12', the front protrusion 44' of each foot 18a', 18b' will prevent the base of the item of stemware from slipping forward.

The racks 10, 10' are disclosed as examples only. Numerous changes to the example racks 10, 10' may be made within the scope of the present disclosure. For instance, in one example, a rack may include two arms that define two or more stem receiving spaces, arranged from front to back. Alternatively, in another example, a rack system may be provided for securing multiple items of stemware. One example of such a system will be disclosed with respect to FIG. 21.

Figure 21:
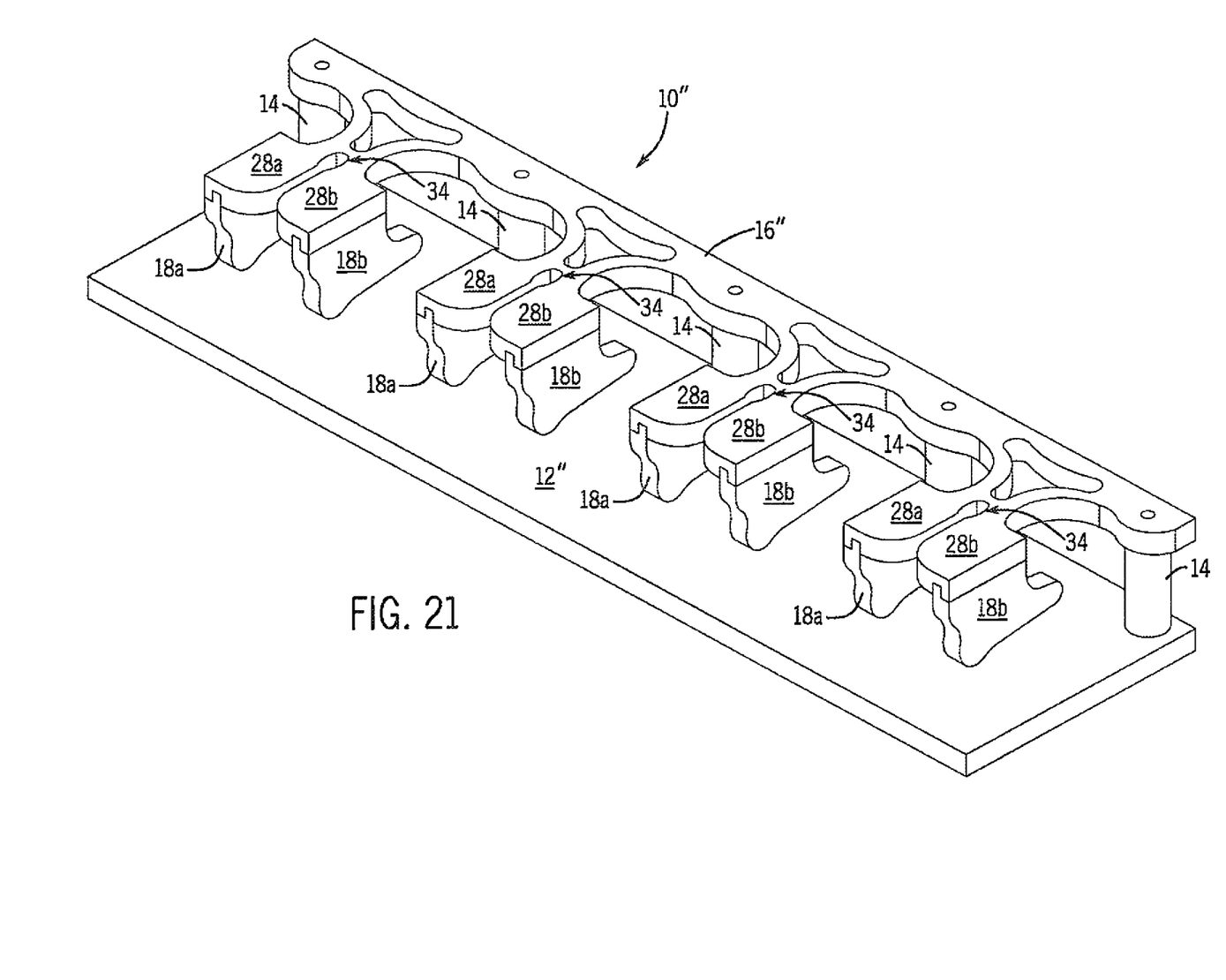
FIG. 21 is an isometric view of an example of a stemware rack.

FIG. 21 is an isometric view of an exemplary integrated rack system 10" for securing a plurality of items of stemware. The system 10" comprises a single apparatus that is similar in design to multiple copies of the rack 10 placed side-by-side. Except as disclosed differently below, the characteristics of similar components of the rack 10 given above and labeled with prime notation are also found in the system 10".

The system 10" includes a base plate 12", a retainer 16", a plurality of feet 18a, 18b, and a plurality of posts 14. The tops of the posts 14 are coupled to a back support portion 26" of the retainer 16", and the bottoms of the posts are coupled to the base plate 12". The base plate 12" is formed from a single, monolithic body of material.

The retainer 16" includes a plurality of arms 28a, 28b, arranged in pairs, with each pair forming a stem receiving space 34. A respective one of the plurality of feet 18a, 18b is coupled to each arm 28a, 28b. The retainer 16" is formed from a single, monolithic body of material.

As an alternative to the system 10", a number of racks 10 may be placed together, with separate retainers 16 and separate base plates 12. In yet another alternative, a single monolithic retainer 16" may be provided, with multiple separate base plates 12, or vice-versa. In still another alternative, the base plate 12" may be omitted, and a support surface may functionally serve as the "base plate." In such an example, the posts 14 may be coupled directly to the support surface with mechanical fasteners, such as screws, with adhesive, and/or with other suitable coupling means, so as to arrange the racks 10 in a desired configuration.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. An apparatus for securing an item of stemware, the apparatus comprising:
a retainer comprising two arms that define a stem receiving space between the two arms, the stem receiving space is configured to receive a stem of the item of stemware, wherein the stem receiving space defines a linear portion and an opening forward of the linear portion;
wherein the arms are laterally flexible so that, when in use, the arms flex away from each other to expand the stem receiving space as the stem of the item of stemware is inserted in the stem receiving space and the arms elastically flex toward each other to secure the stem of the item of stemware in the stem receiving space; and
a foot, that extends downward from the retainer, wherein the foot is configured to secure a base of the item of stemware, wherein the foot comprises a coupling protrusion that is configured to connect to the retainer, wherein the coupling protrusion has a center along a length of the coupling protrusion, wherein a central vertical axis through the center divides the foot into a forward half and a rear half, wherein the forward half and the rear half are asymmetric with respect to each other, wherein the foot further comprises a rounded front protrusion defined in the forward half; and a rounded rear protrusion defined in the rear half; wherein the front protrusion extends farther downward from the retainer than the rear protrusion.

2. The apparatus of claim 1, wherein the front protrusion defines a downward-most portion of the foot.

3. The apparatus of claim 1, wherein:
the foot is a first foot;
the apparatus further comprises a second foot;
the first foot extends downward from a first one of the two arms; and
the second foot extends downward from a second one of the two arms.

4. The apparatus of claim 1, further comprising:
a base plate; and a post having a first end coupled to the base plate and a second end coupled to the retainer, wherein the base plate is disposed downward of the retainer.

5. The apparatus of claim 1, further comprising:
a base plate; wherein a bottom portion of the foot is spaced 0.125 to 1.0 inches from the base plate.

6. The apparatus of claim 1, further comprising:
a base plate; and
wherein the base plate is generally parallel with the retainer;
wherein the foot and the base plate are configured to collectively secure the base of the item of stemware.

7. The apparatus of claim 1, wherein the retainer or the foot comprises polycarbonate resin.

8. The apparatus of claim 1, wherein the foot has a first width and at least one of the arms has a second width, wherein the first width of the foot is less than the second width of the at least one of the arms.

9. The apparatus of claim 1, wherein the retainer and the foot comprises polycarbonate resin.

\* \* \* \* \*